(12) United States Patent
Jaradi et al.

(10) Patent No.: US 11,884,228 B2
(45) Date of Patent: Jan. 30, 2024

(54) AIRBAG ON LAW-ENFORCEMENT VEHICLE PARTITION

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/742,450

(22) Filed: May 12, 2022

(65) Prior Publication Data

US 2023/0365091 A1    Nov. 16, 2023

(51) Int. Cl.
*B60R 21/12*       (2006.01)
*B60R 21/20*       (2011.01)
*B60R 21/231*      (2011.01)

(52) U.S. Cl.
CPC .............. *B60R 21/12* (2013.01); *B60R 21/20* (2013.01); *B60R 2021/23107* (2013.01); *B60R 2021/23153* (2013.01); *B60R 2021/23161* (2013.01)

(58) Field of Classification Search
CPC ....... B60R 21/026; B60R 21/12; B60R 21/20; B60R 21/214; B60R 21/232; B60R 2021/0266; B60R 2021/23107; B60R 2021/23153; B60R 2021/23161
See application file for complete search history.

(56) References Cited

U.S. PATENT DOCUMENTS

| | | | | |
|---|---|---|---|---|
| 4,964,666 A * | 10/1990 | Dillon | ..................... | B60R 21/12 296/24.46 |
| 5,222,761 A * | 6/1993 | Kaji | ..................... | B60R 21/231 280/730.2 |
| 5,246,261 A * | 9/1993 | McCormack | ......... | B60R 21/026 296/24.41 |
| 5,536,057 A * | 7/1996 | Stewart | ................... | B60R 21/12 296/37.16 |
| 6,004,084 A | 12/1999 | Moker | | |
| 6,286,882 B1 | 9/2001 | Rastetter | | |
| 7,441,624 B2 * | 10/2008 | Tobata | .................. | B60R 21/013 701/45 |
| 7,523,956 B2 * | 4/2009 | Zumpano | .......... | B60R 21/01508 280/730.1 |
| 7,726,688 B2 | 6/2010 | Setina | | |
| 7,806,452 B2 * | 10/2010 | Storer | ..................... | B60R 21/12 280/749 |

(Continued)

FOREIGN PATENT DOCUMENTS

DE    102007017998 A1    10/2008

*Primary Examiner* — Laura Freedman
(74) *Attorney, Agent, or Firm* — Frank A. MacKenzie; Bejin Bieneman PLC (57) ABSTRACT

A vehicle includes a vehicle body defines an occupant cabin. The vehicle body includes a ceiling above the occupant cabin and a floor below the occupant cabin. The vehicle includes a partition extending from the floor to the ceiling and dividing the occupant cabin into an officer compartment and a detainee compartment. The partition has a front surface facing the officer compartment and a rear surface facing the detainee compartment. An airbag is supported by the partition and is inflatable into the detainee compartment.

20 Claims, 7 Drawing Sheets

(56) References Cited

U.S. PATENT DOCUMENTS

| | | | |
|---|---|---|---|
| 7,909,379 B2 * | 3/2011 | Winget | B60R 21/026 |
| | | | 410/129 |
| 8,091,939 B2 * | 1/2012 | Forsyth | B60R 21/232 |
| | | | 296/24.42 |
| 8,424,944 B2 * | 4/2013 | Rori | B60R 21/026 |
| | | | 296/193.07 |
| 9,308,883 B1 * | 4/2016 | Schneider | B60R 21/231 |
| 9,511,866 B2 | 12/2016 | Gehret et al. | |
| 9,517,743 B2 * | 12/2016 | Mochizuki | B60R 21/12 |
| 9,688,232 B1 * | 6/2017 | Loew | B60R 21/231 |
| 10,137,853 B2 * | 11/2018 | Ohachi | B60R 21/231 |
| 10,336,275 B2 | 7/2019 | Sundararajan et al. | |
| 10,906,496 B2 * | 2/2021 | Baccouche | B60R 21/213 |
| 11,059,448 B2 * | 7/2021 | Rutelin | B60R 21/216 |
| 11,358,554 B1 * | 6/2022 | Jaradi | B60R 21/231 |
| 11,498,488 B2 * | 11/2022 | Setina | B60R 21/026 |
| 11,554,739 B1 * | 1/2023 | Jaradi | B60R 21/01512 |
| 11,628,795 B1 * | 4/2023 | Jaradi | B60R 21/23138 |
| | | | 280/728.1 |
| 2013/0026803 A1 | 1/2013 | Slam et al. | |
| 2014/0027574 A1 | 1/2014 | Obadia et al. | |
| 2015/0042078 A1 | 2/2015 | Gehret et al. | |
| 2023/0080246 A1 * | 3/2023 | Jaradi | B60R 21/08 |

* cited by examiner

FIG. 7

AIRBAG ON LAW-ENFORCEMENT VEHICLE PARTITION

BACKGROUND

Vehicles law-enforcement vehicle are equipped with airbag assemblies that include an airbag and an inflator. In the event of a vehicle impact, the inflator activates and provides inflation medium to the airbag. This pressurizes the airbag to control the kinematics of an occupant during the vehicle impact. The airbag assemblies may be located at various positions in passenger compartment of the vehicle.

Vehicles can be operated as law-enforcement vehicles operated by police officers or any other type of law-enforcement officer. In such examples, the vehicle may be manufactured and/or retrofitted to operate as a law-enforcement vehicle. As one example, the vehicle may be equipped with a partition that separates a passenger cabin into an officer compartment and a detainee compartment. One or more law-enforcement officers may occupy the officer compartment during operation of the vehicle. A detainee may be detained in the detainee compartment during operation of the vehicle for transportation of the detainee.

DETAILED DESCRIPTION

A vehicle includes a vehicle body defining an occupant cabin. The vehicle body includes a ceiling above the occupant cabin and a floor below the occupant cabin. A partition extends from the floor to the ceiling dividing the occupant cabin into an officer compartment and a detainee compartment. The partition has a front surface facing the officer compartment and a rear surface facing the detainee compartment. An airbag is supported by the partition and is inflatable into the detainee compartment.

The vehicle body includes a right side and a left side and terminates cross-vehicle at the right side and the left side and the partition may extend from the right side to the left side. The partition may be immovably fixed to the left side and the right side. The airbag in the inflated position may be elongated cross-vehicle between the right side and the left side.

The vehicle may include a bench seat in the detainee compartment. The bench seat may have at least two occupant-seating areas arranged cross-vehicle. The airbag may be elongated across at least two occupant-seating areas in the inflated position.

The vehicle may include a second airbag supported by the partition and the second airbag may be inflatable into the officer compartment. The vehicle may include an inflater in fluid communication with both the airbag and the second airbag. The inflator may include a first gas outlet in communication with the airbag and a second gas outlet in communication with the second airbag. The inflator may be mounted to the partition. The vehicle may include a computer having a processor and memory storing instructions executable by the processor, the memory storing instructions to selectively inflate the airbag and the second airbag. The inflator may include a first gas outlet in communication with the airbag and a second gas outlet in communication with the second airbag. The memory may store instructions to selectively inflate the airbag and the second airbag includes instructions to selectively activate the first gas outlet and the second gas outlet. The vehicle may include two front seats in the officer compartment and the second airbag may be inflatable between the two front seats. The vehicle may include a bench seat in the detainee compartment. The bench seat may have at least two occupant-seating areas arranged cross-vehicle. The airbag may be elongated across at least two occupant-seating areas in the inflated position.

The partition may be designed to prevent human travel between the officer compartment and the detainee compartment.

With reference to the Figures, wherein like numerals indicate like parts throughout the several views, a vehicle 2 includes a vehicle body 4 defining an occupant cabin 6. The vehicle body 4 includes a ceiling 8 above the occupant cabin 6 and a floor 10 below the occupant cabin 6. The vehicle 2 includes a partition 12 extending from the floor 10 to the ceiling 8 and dividing the occupant cabin 6 into an officer compartment 14 and a detainee compartment 16. The partition 12 has a front surface 18 facing the officer compartment 14 and a rear surface 20 facing the detainee compartment 16. An airbag 22 is supported by the partition 12 and is inflatable into the detainee compartment 16.

The partition 12 in the vehicle 2 separates the detainees in the detainee compartment 16 from officers in the officer compartment 14. In the event of an impact to the vehicle 2, the airbag 22 supported by the partition 12 may inflate to an inflated position to control the kinematics of a detainee in a variety of positions. The airbag 22 uses the partition 12 as a reaction surface 24 to control the kinematics of the detainee.

The vehicle 2 may be any suitable type of automobile such as a sedan, a coupe, a truck, a sport utility, a crossover, a van, a minivan, a bus, etc. The vehicle 2, for example, may be autonomous. In other words, the vehicle 2 may be autonomously operated such that the vehicle 2 may be driven without constant attention from the driver, i.e., the vehicle 2 may be self-driving without human input. As another example, the vehicle 2 is a law-enforcement vehicle 26 such as a police interceptor, police cruiser, etc. The law-enforcement vehicle 26 is operated by a police officer or any other type of law-enforcement officer. In such examples, the vehicle 2 may be manufactured and/or retrofitted to operate as a law-enforcement vehicle 26.

Figure 1:
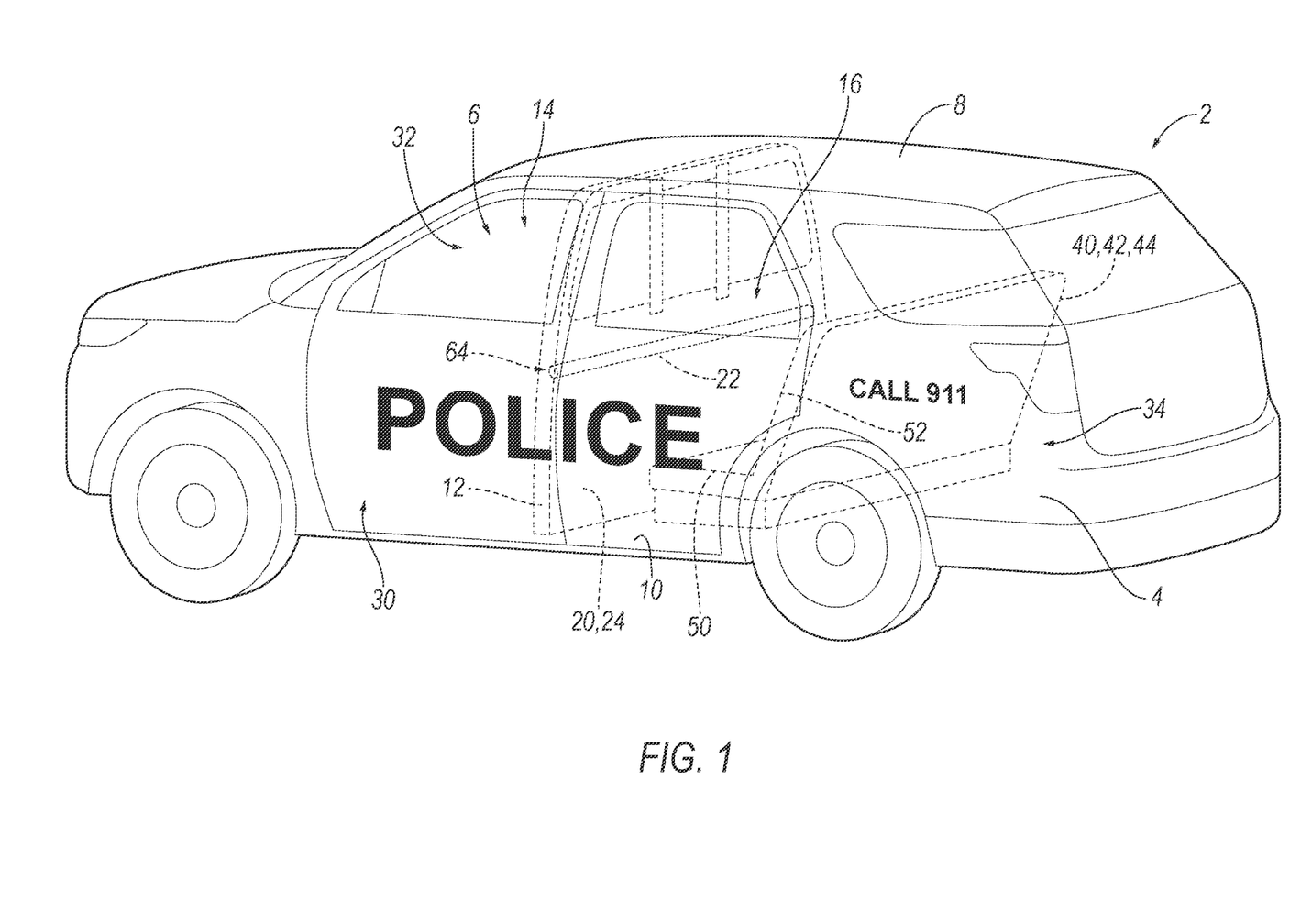
FIG. 1 is a perspective view of a law-enforcement vehicle having a partition and an airbag assembly supported by the partition with an airbag in an uninflated position.
Figure 2:
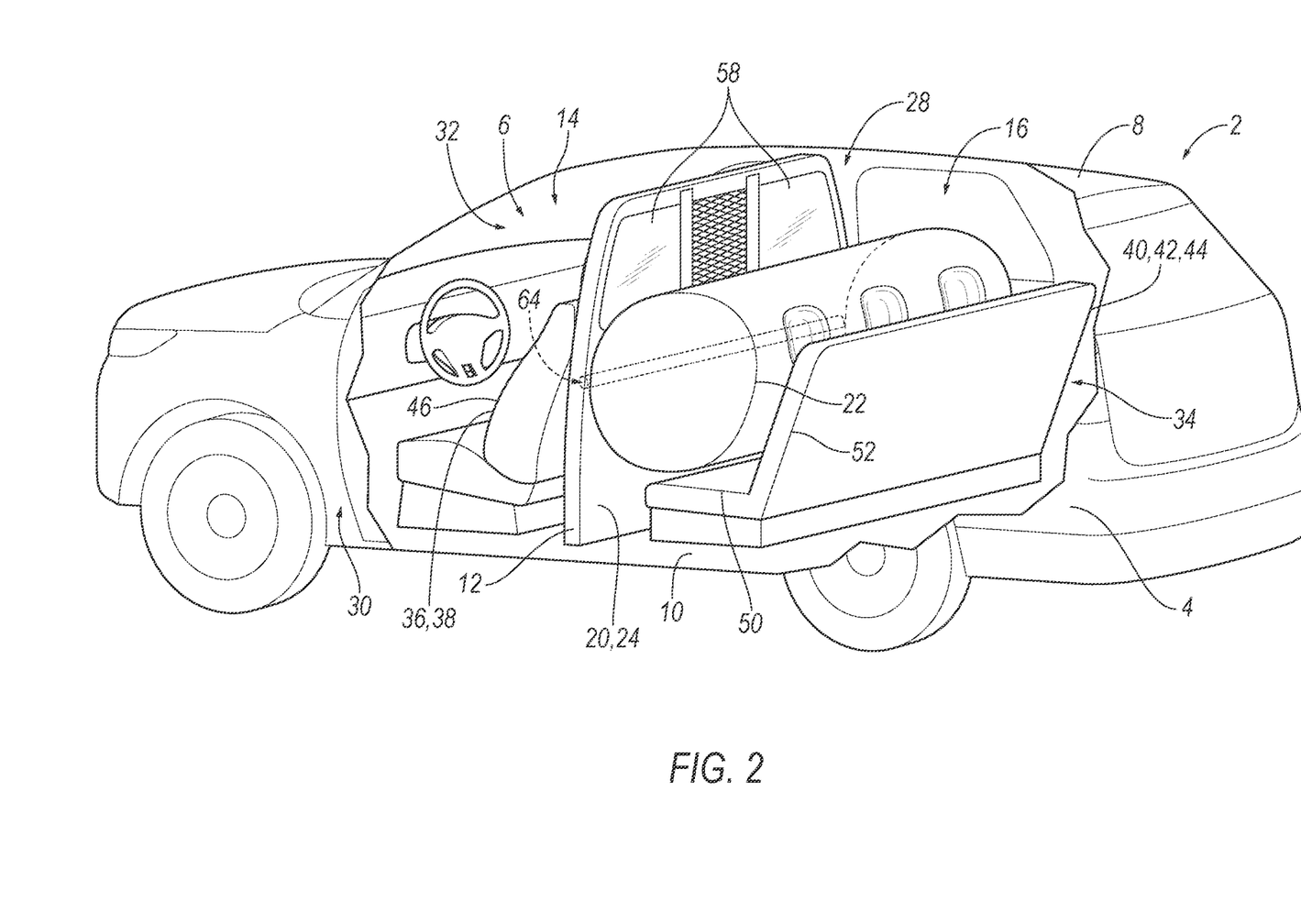
FIG. 2 is a cutaway view of the law-enforcement vehicle with the airbag in an inflated position.
Figure 3:
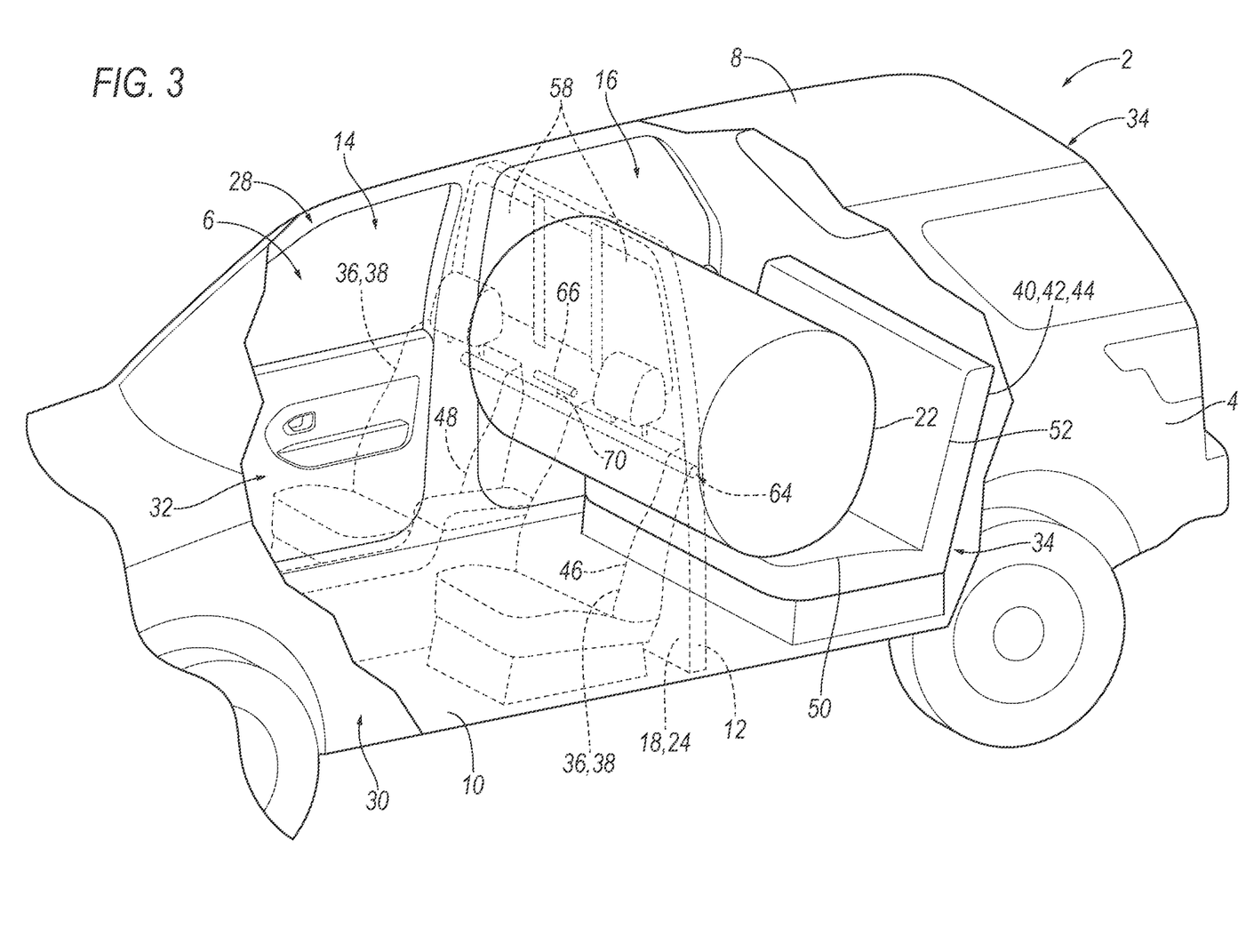
FIG. 3 is another cutaway view of the law-enforcement vehicle with the airbag in the inflated position.

With reference to FIG. 1, the vehicle 2 defines a vehicle-longitudinal axis L extending between a front end (not numbered) and a rear-end (not numbered) of the vehicle 2. The vehicle 2 defines a vehicle-lateral axis A extending cross-vehicle from one side to the other side of the vehicle 2. The vehicle 2 defines a vertical axis V extending through the floor 10 and ceiling 8 of the vehicle 2. The vehicle-longitudinal axis L, the vehicle-lateral axis A, and the vertical axis V are perpendicular relative to each other.

The vehicle 2 includes the vehicle body 4. The vehicle body 4 may be of a unibody construction, a body-on-frame construction, or any suitable construction. In the unibody construction, the vehicle body 4 serves as a frame, and the vehicle body 4 (includes the rockers, pillars, roof rails, etc.) is unitary, i.e., a continuous one-piece unit. As another example, in body-on-frame construction (also referred to as a cab-on-frame construction), the vehicle body 4 and frame are separate components, i.e., are modular, and the vehicle body 4 is supported on and affixed to the frame. Alternatively, the vehicle body 4 may have any suitable construction. The vehicle body 4 may be of any suitable material, for example, steel, aluminum, etc.

The vehicle body 4 defines the occupant cabin 6 to house occupants, if any, of the vehicle 2. The occupant cabin 6 may extend across the vehicle 2, i.e., from a right side 28 to a left side 30 of the vehicle 2. The occupant cabin 6 includes a front end 32 and a rear end 34 with the front end 32 being in front of the rear end 34 during forward movement of the vehicle 2. As set forth above, the partition 12 divides the occupant cabin 6 into the officer compartment 14 and the detainee compartment 16. Specifically, the partition 12 extends cross-vehicle with the officer compartment 14 at the front end 32 of the occupant cabin 6 and the detainee compartment 16 at the rear end 34 of the occupant cabin 6. The occupant cabin 6 may house one or more seats, as described further below.

As set forth above, the vehicle 2 is a law-enforcement vehicle 26. Specifically, the vehicle 2 includes the officer compartment 14 and the detainee compartment 16. The officer compartment 14 is vehicle 2 forward of the detainee compartment 16. The officer compartment 14 houses a law-enforcement officer and law-enforcement gear. The detainee compartment 16 houses a detainee, if any, for transport. The detainee is a person detained by the law-enforcement officer.

With continued reference to FIG. 1, the vehicle body 4 includes the right side 28 and the left side 30 spaced cross-vehicle from each other. The vehicle body 4 terminates cross-vehicle at the right side 28 and the left side 30. The left side 30 and the right side 28 are vehicle-outboard of the occupant cabin 6. The left side 30 and the right side 28 of the vehicle body 4 may be body sides. In such an example, the body side includes one or more door openings. Specifically, the right side 28 and the left side 30 may include pillars. For example, the right side 28 and the left side 30 may include an A-pillar and a B-pillar. The A-pillars may extend between a windshield and a front door. In other words, the A-pillars may be disposed at the front end 32 of the passenger cabin. The B-pillars may extend between the front door and a rear door. In other words, the B-pillars may be spaced from the A-pillars by a front door opening. The vehicle 2 may include additional pillars, e.g., C-pillars, D-pillars.

The vehicle body 4 includes the floor 10. The floor 10 defines a lower boundary of the occupant cabin 6 i.e., the floor 10 is below the occupant cabin 6. The floor 10 may, for example, include a metal pan and may be covered by upholstery, e.g., carpeting, facing the occupant cabin 6. The floor 10 extends from the right side 28 of the vehicle body 4 to the left side 30 of the vehicle body 4 and the ceiling 8 of the vehicle body 4 extends from the right side 28 of the vehicle body 4 to the left side 30 of the vehicle body 4. The ceiling 8 defines an upper boundary of the occupant cabin 6 i.e., the ceiling 8 is above the occupant cabin 6. The pillars, e.g., the B-pillar, may extend from the ceiling 8 to the floor 10.

The seats may be arranged in the occupant cabin 6 in any suitable position, e.g., in rows such as at least one front seat 36 in a front row 38 and at least one rear seat 40 in a rear row 42, as shown in the example shown in FIG. 1. Specifically, in such an example, the vehicle 2 includes two front seats 36 in the officer compartment 14 and a bench seat 44 in the detainee compartment 16. The two front seats 36 are spaced cross-vehicle. The front seats 36, specifically, may be a driver seat 46 and a passenger seat 48, respectively. The front seats 36 may be bucket seats, as shown in the Figures, or may be of any suitable configuration.

The rear seat 40, e.g., the bench seat 44, is vehicle-rearward of the two front seats 36 as shown in the Figures. In such an example, the bench seat 44 includes at least two occupant-seating areas arranged cross-vehicle and a seatbelt (not numbered) for each of a plurality of occupants, e.g., two occupants. Specifically, the bench seat 44 includes a seat bottom 50 and a seat back 52 both elongated across more than two occupant-seating areas. As another example, the vehicle 2 may include a plurality of rear seats 40 in the detainee compartment 16 arranged cross-vehicle, e.g., bucket seats, captain chairs, etc.

The partition 12 is designed to prevent human travel between the officer compartment 14 and the detainee compartment 16. Specifically, the partition 12 prevents the detainee from moving from the detainee compartment 16 to the officer compartment 14. The vehicle 2 may include other features for containing the detainee in the detainee compartment 16, e.g., window locks, door locks, etc. The partition 12, for example, may include a frame and a covering. The frame of the partition 12 may be metal. The covering of the partition 12 may include upholstery, padding, etc. The upholstery may be cloth, leather, faux leather, or any other suitable material. The partition 12 may include a window 58 for viewing between officer compartment 14 and the detainee compartment 16. The window 58 may be, for example, acrylic, glass, including reinforcement (e.g., mesh, bars, etc.) or any suitable material with transparency to operate as a window and strength to prevent human travel between the officer compartment 14 and the detainee compartment 16. The partition 12 may include a class-A surface exposed to the passenger cabin. A class-A surface is a finished surface free of unaesthetic blemishes and defects and exposed to view by a vehicle occupant seated in the vehicle 2.

The partition 12 is elongated in the cross-vehicle direction. The partition 12 extends from the right side 28 of the vehicle body 4 to the left side 30 of the vehicle body 4 between the officer compartment 14 and the detainee compartment 16. Specifically, the partition 12 may abut the left side 30 and the right side 28 and may be connected to the left side 30 and/or the right side 28. Specifically, the partition 12 may be connected to the B-pillars, e.g., with one or more fasteners, welds, etc.

The partition 12 is upright relative to the floor 10. The partition 12 may extend from the floor 10 to the ceiling 8 to divide the officer compartment 14 and the detainee compartment 16. In such an example the partition 12 may abut the floor 10 and the ceiling 8 and may be connected to the floor 10 and the ceiling 8.

As set forth above, the partition 12 is immovably fixed to the vehicle body 4. In other words, the partition 12 does not move relative to the vehicle body 4 during normal operation to maintain separation of the officer compartment 14 and the detainee compartment 16. In contrast, the partition 12 may be removed from the vehicle body 4 by an automotive technician, e.g., with tools to destroy welds, remove fasteners, etc., for service and when the vehicle 2 is not in use by a law-enforcement officer. The partition 12 may be immovably fixed to the right side 28 (e.g., the B-pillar), left side 30 (e.g., the B-pillar, the floor 10, and/or the ceiling 8. The partition 12 may be immovably fixed to the vehicle body 4 with, for example, one or more fasteners, welds, etc.

The partition 12 has the front surface 18 and the rear surface 20 opposite to the front surface 18. The front surface 18 is spaced from the rear surface 20. In the example shown in the Figures, the front surface 18 is facing the officer compartment 14 and the rear surface 20 is facing the detainee compartment 16. The airbag 22 in an uninflated position may be between the front surface 18 and the rear surface 20 and inflatable from the partition 12, as described further below.

The vehicle 2 includes an airbag assembly 64 mounted to the partition 12. The airbag assembly 64 includes the airbag 22 and an inflator 66. In the example shown in the Figures, the airbag assembly 64 may include a second airbag 68. In such examples, the airbag 22 is inflatable vehicle-rearward from the partition 12 and the second airbag 68 inflatable vehicle 2 forward of the partition 12. The airbag assembly 64 may include any suitable number of airbags 22, i.e., one or more. In some examples, the airbag assembly 64 may include a housing (not shown in the example in the Figures). The airbag housing may be of any suitable material, e.g., a rigid polymer, a metal, a composite, or a combination of rigid materials.

As described further below, the airbag 22 is mounted to the partition 12. In the uninflated position, the airbag 22 may be rolled and/or folded on the partition 12. In the undeployed position, the airbag 22 may be elongated along the vehicle-lateral axis A between the front surface 18 of the partition 12 and the rear surface 20 of the partition 12. The airbag 22 is inflatable into the detainee compartment 16 between the partition 12 and the bench seat 44 from the uninflated position to the inflated position. Specifically, the airbag 22 in the inflated position extends from the rear surface 20 of the partition 12 into the detainee compartment 16. The airbag 22 being on the partition 12 alleviates packaging constrains and accommodates the operation of the airbag 22. In the event of a vehicle impact, the airbag 22 inflates to the inflated position to control the kinematics of the occupants of the rear seat 40.

In examples that include the second airbag 68, the second airbag 68 is mounted to the partition 12 and inflatable into the officer compartment 14 between the front seats 36, e.g., the driver seat 46 and the passenger seat 48, to control the kinematics of the occupants of the front seats 36. Specifically, the second airbag 68 in the inflated position extends from the front surface 18 of the partition 12 into the detainee compartment 16. In the uninflated position, the airbag 22 may be rolled and/or folded on the partition 12.

Figure 4:
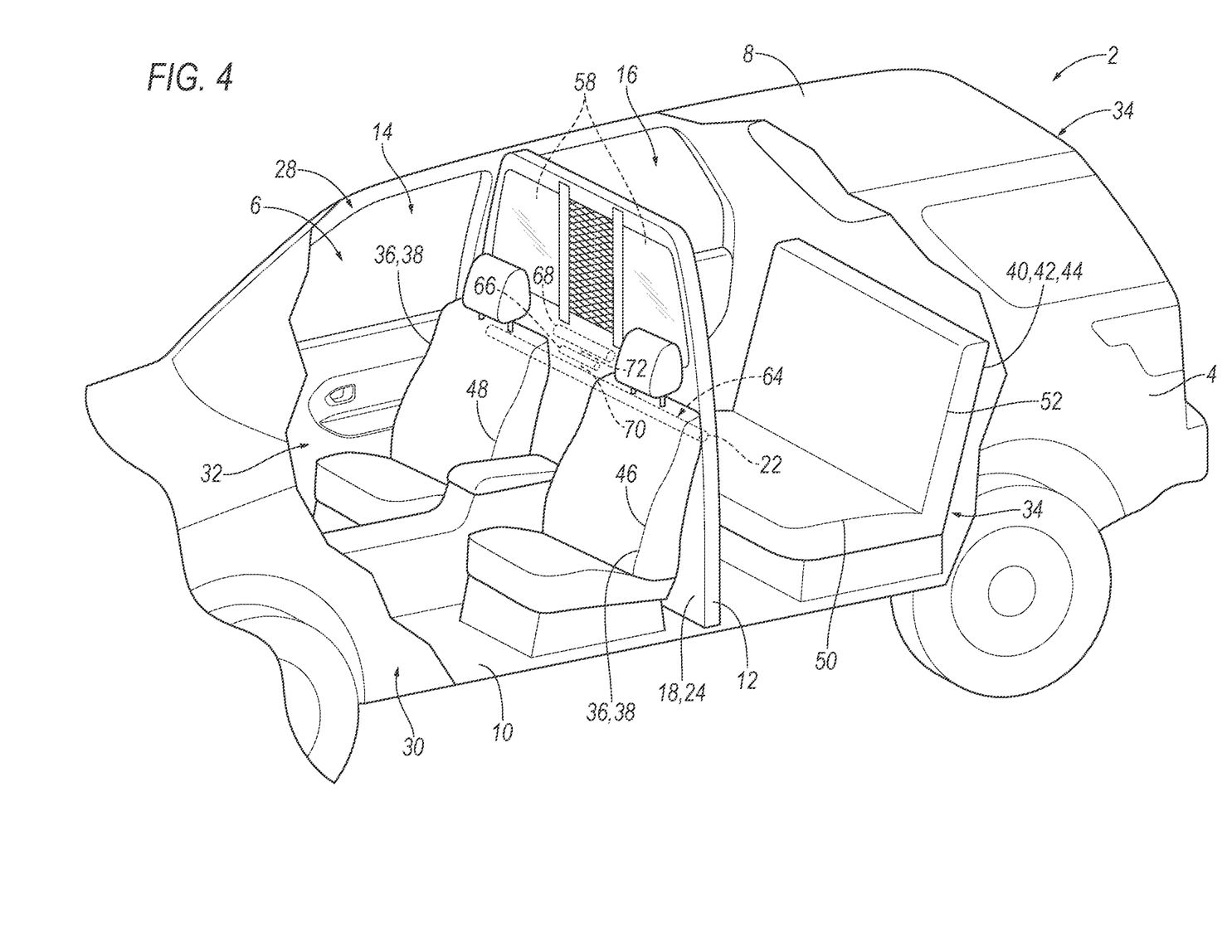
FIG. 4 is a cutaway view of the law-enforcement vehicle with perspective view of a law-enforcement vehicle including another example of the airbag assembly including the airbag and a second airbag both in an uninflated position.

The airbag 22 is supported by the partition 12 and, in examples including the second airbag 68, the second airbag 68 is supported by the partition 12. In the example shown in FIGS. 1 and 4, the airbag 22 is between the front surface 18 and the rear surface 20 of the partition 12. Specifically, the airbag 22 is mounted to the partition 12, e.g., under a class-A surface. In examples including the airbag 22 and the second airbag 68, both the airbag 22 and second airbag 68 may be in one housing or may be in separate housings. The airbag 22 and/or the second airbag 68 may be anchored to the partition 12 or the housing, e.g., with fasteners, bolts, etc.

Figure 5:
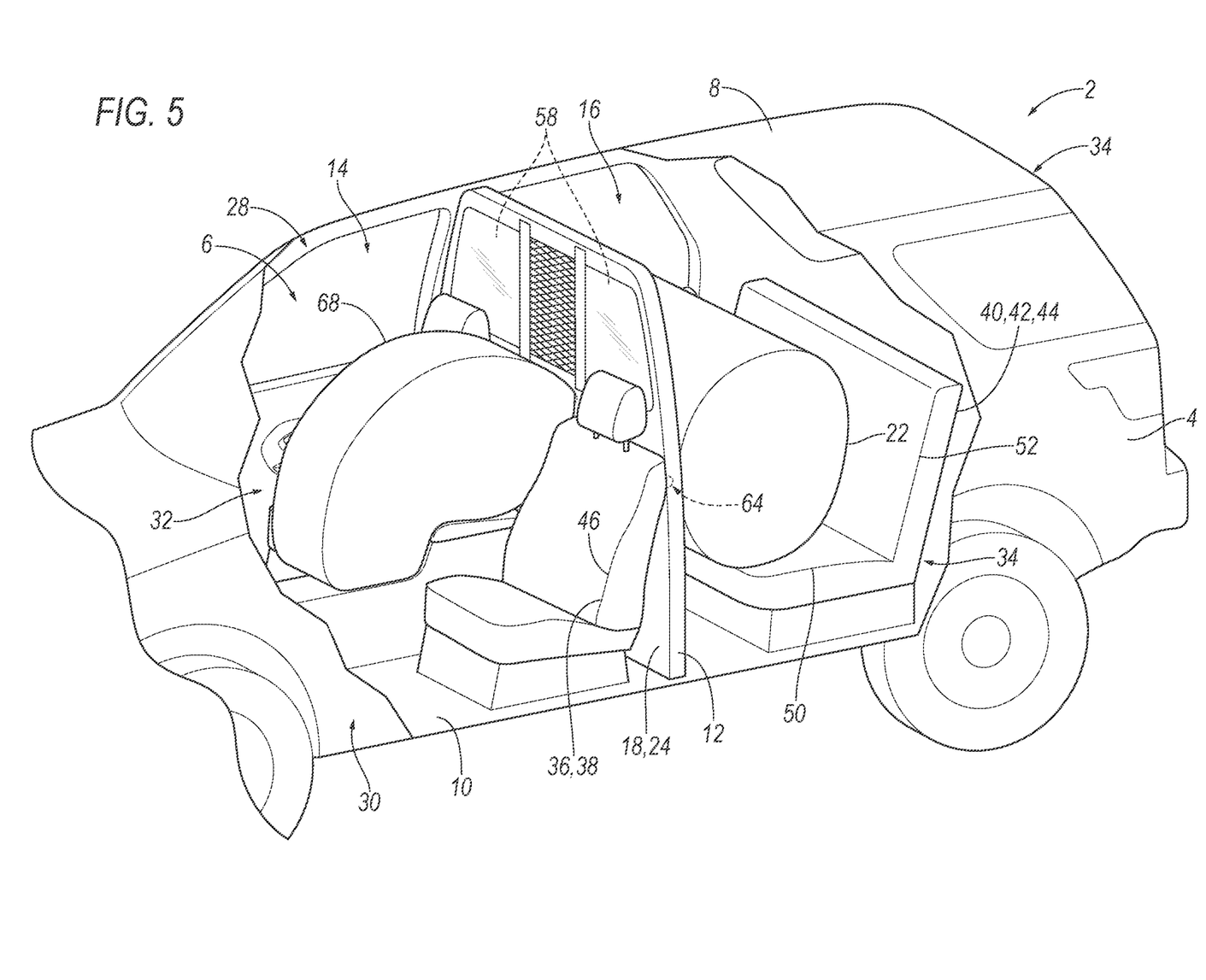
FIG. 5 is the cutaway view of FIG. 4 with the airbag and the second airbag in inflated positions.

As set forth above, the airbag 22 inflates from the partition 12 vehicle-rearward and the second airbag 68 inflates from the partition 12 vehicle-forward. In the example shown in FIG. 5, the airbag 22 is inflatable into the detainee compartment 16 and the second airbag 68 is inflatable into the officer compartment 14. In such an example, the airbag 22 is disposed between the partition 12 and rear seats 40 to control the kinematics of the occupant(s) of the rear seats 40, including during vehicle frontal impact, and the second airbag 68 is disposed between the two front seats 36 of the vehicle 2 to control the kinematics of the occupants of the front seat 36, including during vehicle side impact. In such examples, the airbag 22 may be elongated across at least two occupant-seating areas in the inflated position. Specifically, the airbag 22 may be vehicle-forward of at least two occupant-seating areas in the rear row 42, i.e., elongated in the cross-vehicle direction to be vehicle-forward of the of at least two occupant-seating areas in the rear row 42. In that example, the airbag 22 controls the kinematics of occupants seated in any of the of at least two occupant-seating areas in the rear row 42.

As set forth above, the airbag 22 may be elongated in a cross-vehicle direction. Specifically, the airbag 22 may be elongated cross-vehicle between the left side 30 and the right side 28 of the vehicle body 4 in the inflated position. In the inflated position, the airbag 22 may be elongated along the vehicle-lateral axis A, and in examples including the second airbag 68, the second airbag 68 may be elongated along the vehicle-longitudinal axis L. In other words, the second airbag 68 is inflatable between the two front seats 36.

The airbag 22, and the second airbag 68 in examples including the second airbag 68, may be fabric, e.g., a woven polymer yarn. The woven polymer yarn may be, for example, nylon 66. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The airbag 22 includes at least one inflator 66. The inflator 66 is in fluid communication with the airbag 22. In examples including the second airbag 68, the inflator 66 may inflate both the airbag 22 and the second airbag 68. In examples including one inflator 66 that inflates both the airbag 22 and the second airbag 68, the inflator 66 may include a first gas outlet 70 in communication with the airbag 22 and a second gas outlet 72 in communication with the second airbag 68. In such an example, the inflator 66 may selectively activate the first gas outlet 70 and the second gas outlet 72, as described further below. In such examples, the inflator 66 may supply inflation medium to the airbag 22 through the first gas outlet 70 and may supply inflation medium to the second airbag 68 through the second gas outlet 72 independently of each other. The inflator 66 may be of a known type that independently activate the first gas outlet 70 and the second gas outlet 72. As an example, the inflator 66 may include separate pyrotechnic charges for the first gas outlet 70 and the second gas outlet 72 that are independently ignitable. As another example, the inflator 66 may include a valve, diverter, etc., that selectively directs inflation medium to only the first gas outlet 70, only the second gas outlet 72, or both the first gas outlet 70 and the second gas outlet 72. As another example, the airbag assembly 64 may include two inflators 66, one inflator 66 for the airbag 22 and the other inflator 66 for the second airbag 68. The inflator 66 or inflators 66 expand the airbag 22 and the second airbag 68 with inflation medium, such as a gas, to move the airbag 22 from the uninflated position to the inflated position. The inflator 66 may be supported by the partition 12, i.e., the weight of the inflator 66 may be borne by the partition 12. For example, the inflator 66 may be fixed to the partition 12 with fasteners. The inflator 66 may be, for example, a pyrotechnic inflator 66 that ignites a chemical reaction to generate the inflation medium, a stored gas inflator 66 that releases (e.g., by a pyrotechnic valve) stored gas as the inflation medium, or a hybrid. The inflator 66 may be, for example, at least partially in an inflation chamber of the airbag 22 to deliver inflation medium directly to the inflation chamber or may be connected to the inflation chamber through fill tubes, diffusers, etc.

The vehicle 2 may include a computer 74 having a processor and a memory storing instructions executable by the processor to deploy the airbag 22. Specifically, the memory stores instructions to perform the function described herein, including method 700 in FIG. 7. The computer 74 may be, for example, a restraints control module. Use of "in response to," "based on," and "upon determining" herein indicates a causal relationship, not merely a temporal relationship.

Figure 6:
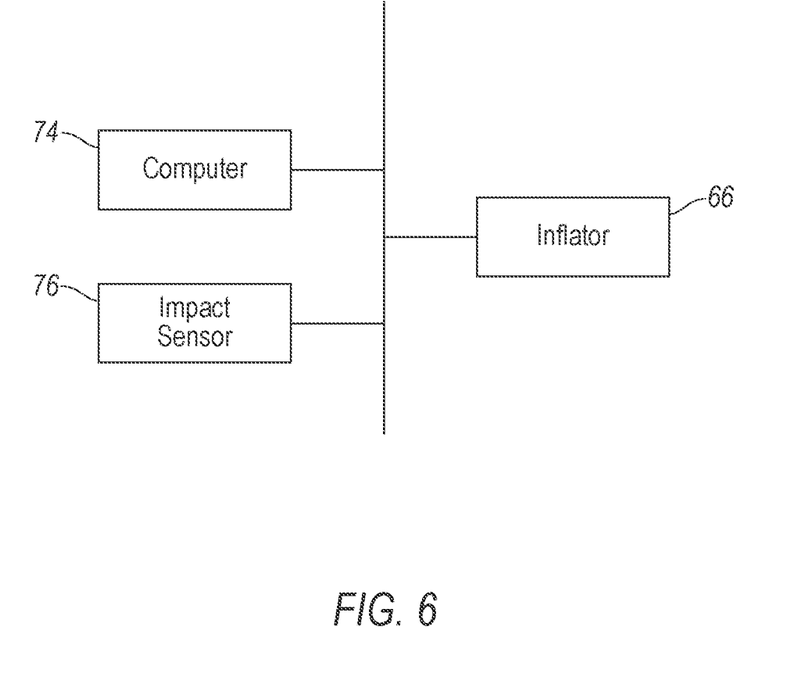
FIG. 6 is a block diagram of a system of the vehicle.

The memory includes one or more forms of computer 74 readable media, and stores instructions executable by the processor for performing various operations including as disclosed herein. For example, the computer 74 can be a generic computer 74 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 74 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 74. The memory can be of any type, e.g., hard disk drives, solid state drives, servers, or any volatile or non-volatile media. The memory can store the collected data sent from the sensors. The memory can be a separate device from the computer 74, and the computer 74 can retrieve information stored by the memory via a network in the vehicle 2, e.g., over a CAN bus, a wireless network, etc. Alternatively or additionally, the memory can be part of the computer 74, e.g., as a memory of the computer 74. The computer 74 may include programming to operate one or more of vehicle brakes, propulsion e.g., control of acceleration in the vehicle 2 by controlling one or more of an internal combustion engine, electric motor, hybrid engine, etc., steering, climate control, interior and/or exterior lights, etc., as well as to determine whether and when the computer 74, as opposed to a human operator, is to control such operations. Additionally, the computer 74 may be programmed to determine whether and when a human operator is to control such operations. The computer 74 may include or be communicatively coupled to, e.g., via a vehicle network such as a communications bus as described further below, more than one processor, e.g., included in components such as sensors, electronic control units (ECUs) or the like included in the vehicle 2 for monitoring and/or controlling various vehicle components, e.g., a powertrain controller, a brake controller, a steering controller, etc. As shown in FIG. 6, the computer 74 is generally arranged for communications on a vehicle communication network that can include a bus in the vehicle 2 such as a controller area network CAN or the like, and/or other wired and/or wireless mechanisms. Alternatively or additionally, in cases where the computer 74 actually comprises a plurality of devices, the vehicle communication network may be used for communications between devices represented as the computer 74 in this disclosure. Further, as mentioned below, various controllers and/or sensors may provide data to the computer 74 via the vehicle communication network.

The vehicle 2 may include at least one impact sensor 76 for sensing impact of the vehicle 2, and the computer 74 in communication with the impact sensor 76. Alternatively or additionally to sensing impact, the impact sensor 76 may be configured to sense impact prior to impact, i.e., pre impact sensing. The impact sensor 76 is configured to detect an impact to the vehicle 2. The impact sensor 76 may be of any suitable type, for example, post contact sensors such as accelerometers, pressure sensors, and contact switches; and pre impact sensors 76 such as radar, LIDAR, and vision sensing systems. The vision sensing systems may include one or more cameras, CCD image sensors, CMOS image sensors, etc. The impact sensor 76 may be located at numerous points in or on the vehicle 2.

Figure 7:
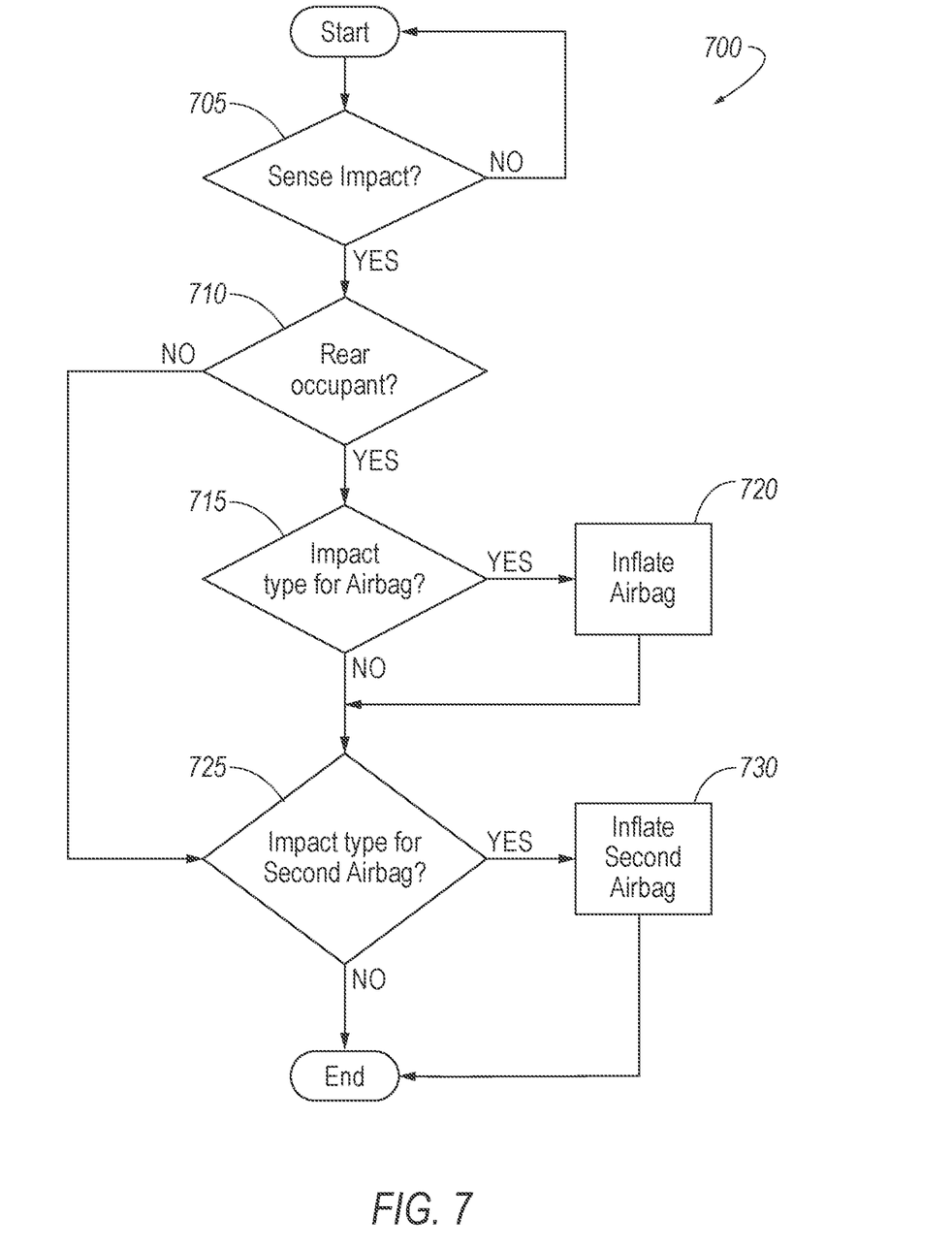
FIG. 7 is a method performed by the system of the vehicle.

With reference to FIG. 7, the computer 74 is programmed to perform the method 700. In examples including the airbag 22 and the second airbag 68, the method 700 includes instructions to selectively inflate the airbag 22 and the second airbag 68. In other words, in response to a vehicle impact, the airbag 22 can be inflated and the second airbag 68 not inflated, the second airbag 68 can be inflated and the airbag 22 not inflated, or both the airbag 22 and the second airbag 68 can be inflated. The selection of inflation of the airbag 22 and/or the second airbag 68 may be based on impact type, e.g., direction of impact, speed of impact, etc. In examples in which the inflator 66 includes the first gas outlet 70 and the second gas outlet 72, the instructions to selectively inflate the airbag 22 and the second airbag 68 may include instructions to selectively activate the first gas outlet 70 and the second gas outlet 72. In other words, the first gas outlet 70 can be activated to inflate the airbag 22 and the second gas outlet 72 not activated to not inflate the second airbag 68, the second gas outlet 72 can be activated to inflate the second airbag 68 and the first gas outlet 70 not activated to not inflate the airbag 22, or both the first gas outlet 70 and the second gas outlet 72 can be activated to inflate both the airbag 22 and the second airbag 68.

With reference to block 705, the method 700 includes detecting vehicle impact. In the event a vehicle impact is detected, the method 700 proceeds to decision blocks 710 and 720. For illustrative purposes, decision block 710 is shown before decision block 720. Decision blocks 710 and 720 may be performed in any order or may be performed simultaneously.

In decision block 710, the method 700 includes determining whether the impact type is such that the airbag 22 should be inflated. As set forth above, the impact type may be based on impact direction, impact speed, etc. If the impact type is such that the airbag 22 should be inflated, the method 700 includes inflating the airbag 22, as shown in block 715. Specifically, the method 700 includes instructing the inflator 66 to inflate the airbag 22. In examples in which the inflator 66 inflates both the airbag 22 and the second airbag 68 through the first gas outlet 70 and the second gas outlet 72, respectively, block 715 includes activating the first gas outlet 70.

In decision block 720, the method 700 includes determining whether the impact type is such that the second airbag 68 should be inflated. As set forth above, the impact type may be based on impact direction, impact speed, etc. If the impact type is such that the second airbag 68 should be inflated, the method 700 includes inflating the second airbag 68, as shown in block 725. Specifically, the method 700 includes instructing the inflator 66 to inflate the second airbag 68. In examples in which the inflator 66 inflates both the airbag 22 and the second airbag 68 through the first gas outlet 70 and the second gas outlet 72, respectively, block 725 includes activating the second gas outlet 72.

In situations where the impact type is such that the airbag 22 should be inflated based on decision block 710 and the second airbag 68 should be inflated based on decision block 720, both the airbag 22 and the second airbag 68 are inflated. For example, in examples in which the inflator 66 inflates both the airbag 22 and the second airbag 68 through the first gas outlet 70 and the second gas outlet 72, respectively, the method 700 includes activating both the first gas outlet 70 and the second gas outlet 72.

The numerical adjectives, e.g., "first," "second," etc., are used herein merely as identifiers and do not signify order or importance. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle body defining an occupant cabin;
   the vehicle body including a ceiling above the occupant cabin and a floor below the occupant cabin;
   a partition extending from the floor to the ceiling dividing the occupant cabin into an officer compartment and a detainee compartment;
   the partition having a front surface facing the officer compartment and a rear surface facing the detainee compartment; and
   an airbag supported by the partition in an uninflated position and being inflatable into the detainee compartment.

2. The vehicle of claim 1, wherein the vehicle body includes a right side and a left side and terminates cross-vehicle at the right side and the left side, the partition extending from the right side to the left side.

3. The vehicle of claim 2, wherein the partition is immovably fixed to the left side and the right side.

4. The vehicle of claim 2, wherein the airbag in an inflated position is elongated cross-vehicle between the right side and the left side.

5. The vehicle of claim 1, further comprising a bench seat in the detainee compartment, the bench seat having at least two occupant-seating areas arranged cross-vehicle, the airbag being elongated across the at least two occupant-seating areas in an inflated position.

6. The vehicle of claim 1, further comprising a second airbag supported by the partition, the second airbag being inflatable into the officer compartment.

7. The vehicle of claim 6, further comprising an inflator in fluid communication with both the airbag and the second airbag.

8. The vehicle of claim 7, wherein the inflator includes a first gas outlet in communication with the airbag and a second gas outlet in communication with the second airbag.

9. The vehicle of claim 7, wherein the inflator is mounted to the partition.

10. The vehicle of claim 6, further comprising a computer having a processor and memory storing instructions executable by the processor, the memory storing instructions to selectively inflate the airbag and the second airbag.

11. The vehicle of claim 10, wherein the inflator includes a first gas outlet in communication with the airbag and a second gas outlet in communication with the second airbag, and wherein instructions to selectively inflate the airbag and the second airbag includes instructions to selectively activate the first gas outlet and the second gas outlet.

12. The vehicle of claim 6, further comprising two front seats in the officer compartment, the second airbag being inflatable between the two front seats.

13. The vehicle of claim 12, further comprising a bench seat in the detainee compartment, the bench seat having at least two occupant-seating areas arranged cross-vehicle, the airbag being elongated across the at least two occupant-seating areas in an inflated position.

14. The vehicle of claim 1, wherein the partition is designed to prevent human travel between the officer compartment and the detainee compartment.

15. A vehicle comprising:
   a vehicle body defining an occupant cabin;
   the vehicle body including a ceiling above the occupant cabin and a floor below the occupant cabin;
   a partition extending from the floor to the ceiling dividing the occupant cabin into an officer compartment and a detainee compartment;
   the partition having a front surface facing the officer compartment and a rear surface facing the detainee compartment;
   an airbag supported by the partition and being inflatable into the detainee compartment; and
   a bench seat in the detainee compartment, the bench seat having at least two occupant-seating areas arranged cross-vehicle, the airbag extending across the at least two occupant-seating areas vehicle-forward of the at least two occupant-seating areas in an inflated position.

16. The vehicle of claim 15, wherein the vehicle body includes a right side and a left side and terminates cross-vehicle at the right side and the left side, the partition extending from the right side to the left side.

17. A vehicle comprising:
   a vehicle body defining an occupant cabin;
   the vehicle body including a ceiling above the occupant cabin and a floor below the occupant cabin;
   a partition extending from the floor to the ceiling dividing the occupant cabin into an officer compartment and a detainee compartment;
   the partition having a front surface facing the officer compartment and a rear surface facing the detainee compartment;
   an airbag supported by the partition and being inflatable into the detainee compartment;
   a second airbag supported by the partition, the second airbag being inflatable into the officer compartment; and
   two front seats in the officer compartment, the second airbag being inflatable between the two front seats.

18. The vehicle of claim 17, further comprising a bench seat in the detainee compartment, the bench seat having at least two occupant-seating areas arranged cross-vehicle, the airbag being elongated across the at least two occupant-seating areas in an inflated position.

19. The vehicle of claim 17, further comprising a computer having a processor and memory storing instructions executable by the processor, the memory storing instructions to selectively inflate the airbag and the second airbag.

20. The vehicle of claim 17, wherein the vehicle body includes a right side and a left side and terminates cross-vehicle at the right side and the left side, the partition extending from the right side to the left side.

* * * * *